United States Patent
Matsuo et al.

(10) Patent No.: US 10,119,717 B2
(45) Date of Patent: Nov. 6, 2018

(54) HEAT SOURCE SYSTEM, AND DEVICE AND METHOD FOR CONTROLLING COOLING WATER SUPPLY DEVICE

(71) Applicant: MITSUBISHI HEAVY INDUSTRIES THERMAL SYSTEMS, LTD., Tokyo (JP)

(72) Inventors: Minoru Matsuo, Tokyo (JP); Satoshi Nikaido, Tokyo (JP); Koki Tateishi, Tokyo (JP); Toshiaki Ouchi, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 580 days.

(21) Appl. No.: 14/655,645

(22) PCT Filed: Jul. 12, 2013

(86) PCT No.: PCT/JP2013/069104
§ 371 (c)(1),
(2) Date: Jun. 25, 2015

(87) PCT Pub. No.: WO2014/119027
PCT Pub. Date: Aug. 7, 2014

(65) Prior Publication Data
US 2015/0354849 A1     Dec. 10, 2015

(30) Foreign Application Priority Data
Jan. 31, 2013    (JP)  ................................. 2013-017063

(51) Int. Cl.
*F25B 49/02*      (2006.01)
*F24F 11/02*      (2006.01)
(Continued)

(52) U.S. Cl.
CPC .............. *F24F 11/022* (2013.01); *F24F 3/06* (2013.01); *F24F 5/0003* (2013.01); *F24F 11/72* (2018.01);
(Continued)

(58) Field of Classification Search
CPC ..... F24F 5/0003; F25B 25/005; F25B 49/027; F25B 2339/07; F25B 2600/021; F25B 2600/111; F25B 2600/13
See application file for complete search history.

(56) References Cited

U.S. PATENT DOCUMENTS 4,474,027 A     10/1984   Azmi et al.
5,040,377 A *   8/1991   Braun ................... F25B 49/027
                                                        165/299
(Continued)

FOREIGN PATENT DOCUMENTS

CN         1206826 A     2/1999
CN     101017021 A     8/2007
(Continued)

OTHER PUBLICATIONS

International Search Report, issued in PCT/JP2013/069104, dated Oct. 15, 2013.
(Continued)

*Primary Examiner* — Jonathan Bradford
(74) *Attorney, Agent, or Firm* — Birch, Stewart, Kolasch & Birch, LLP (57) ABSTRACT

In order to achieve a reduction in energy consumption in a cooling water supply device without using a database, an equipment control device (70a) of a cooling water supply device: uses the load of a chiller, and a cooling water outlet temperature lower limit setpoint determined in accordance with the set temperature for the cooling water outlet of the chiller, to set a cooling water inlet temperature lower limit
(Continued)

setpoint; sets, as the cooling water inlet temperature setpoint, the higher of the lower limit setpoint and the cooling water inlet temperature lower limit value as determined from the outside wet-bulb temperature; and generates a control command for a cooling tower fan and a control command for the cooling water flow volume, so as to match the cooling water inlet temperature and the cooling water outlet temperature respectively with the cooling water inlet temperature setpoint and the cooling water outlet temperature lower limit setpoint which have been set.

5 Claims, 5 Drawing Sheets

(51) Int. Cl.
*F24F 3/06* (2006.01)
*F25D 17/02* (2006.01)
*F28F 27/00* (2006.01)
*F24F 5/00* (2006.01)
*F25B 25/00* (2006.01)
*F24F 11/72* (2018.01)
*F25B 1/053* (2006.01)
*F25B 1/10* (2006.01)

(52) U.S. Cl.
CPC .......... *F25B 25/005* (2013.01); *F25B 49/027* (2013.01); *F25D 17/02* (2013.01); *F28F 27/00* (2013.01); *F25B 1/053* (2013.01); *F25B 1/10* (2013.01); *F25B 49/02* (2013.01); *F25B 2339/047* (2013.01); *F25B 2600/021* (2013.01); *F25B 2600/111* (2013.01); *F25B 2600/13* (2013.01); *F25B 2700/21161* (2013.01); *F25B 2700/21171* (2013.01); *Y02B 30/741* (2013.01); *Y02B 30/743* (2013.01); *Y02B 30/745* (2013.01)

(56) References Cited

U.S. PATENT DOCUMENTS

| | | | | |
|---|---|---|---|---|
| 5,651,264 | A | * | 7/1997 | Lo .......................... F24F 3/065 165/218 |
| 2010/0023167 | A1 | | 1/2010 | Ito et al. |
| 2011/0030405 | A1 | | 2/2011 | Ueda |

FOREIGN PATENT DOCUMENTS

| | | | |
|---|---|---|---|
| CN | 101251291 | A | 8/2008 |
| CN | 101660815 | A | 3/2010 |
| CN | 201463177 | U | 5/2010 |
| CN | 101737899 | A | 6/2010 |
| JP | 59-145499 | A | 8/1984 |
| JP | 2000-337729 | A | 12/2000 |
| JP | 2005-114295 | A | 4/2005 |
| JP | 2007-298235 | A | 11/2007 |
| JP | 2008-256258 | A | 10/2008 |
| JP | 2008-261536 | A | 10/2008 |
| JP | 2010-54152 | A | 3/2010 |
| JP | 2011-127859 | A | 6/2011 |
| JP | 2011-226684 | A | 11/2011 |

OTHER PUBLICATIONS

Written Opinion of the International Searching Authority, issued in PCT/JP2013/069104, dated Oct. 15, 2013.
Chinese Office Action and Search Report, dated Nov. 2, 2016, for Chinese Application No. 201380064274.0, with an English translation.
Japanese Decision to Grant a Patent, dated Jul. 5, 2016 for Japanese Patent Application No. 2013-017063.
Korean Notice of Allowance, dated Jul. 14, 2016, for Korean Application No. 10-2015-7015664, including an English translation.

* cited by examiner

HEAT SOURCE SYSTEM, AND DEVICE AND METHOD FOR CONTROLLING COOLING WATER SUPPLY DEVICE

TECHNICAL FIELD

The present invention relates to a heat source system including a chiller, and particularly, relates to a device and a method for controlling a cooling water supply device which includes a cooling tower and supplies cooling water to a chiller.

BACKGROUND ART

In the related art, a heat source is known, which includes a cooling tower and a cooling water supply device supplying cooling water to a condenser of a chiller. In the field of the heat source system, a technology is suggested, which decreases the power consumption of the cooling water supply device due to need for a reduction in energy consumption.

For example, PTL 1 discloses that a database which indicates relative relationships between an outside wet-bulb temperature, a cooling load, and cooling operations of a cooling tower and a chiller is prepared in advance, and switching between the operations of the chiller and the cooling tower and a control with respect to a cooling water flow rate are performed using the database.

CITATION LIST

Patent Literature

[PTL 1] Japanese Unexamined Patent Application Publication No. 2011-226684

SUMMARY OF INVENTION

Technical Problem

However, in the control method disclosed in PTL 1, it is necessary to prepare the database, which indicates the relative relationships between the outside wet-bulb temperature, the cooling load, and the cooling operations of the cooling tower and the chiller, in advance. Since a characteristic in a coefficient of performance of the chiller with respect to the cooling load is different according to the heat source system, it is necessary to construct a database for each system, and thus, much time and labor required. In addition, also when the chiller configuring the system is replaced, since the characteristics in a coefficient of performance of the chiller are different, it is necessary to update the database, and it is necessary to reconsider the database for each partial change of the system.

In the related art, in a temperature control of cooling water in a cooling water supply device, a lower limit value of a cooling water inlet temperature is determined as a fixed value in advance due to the limitation in the operation of the chiller, and the temperature control of the cooling water is performed so that the cooling water inlet temperature is not less than the cooling water inlet temperature lower limit value. However, according to the operation state of the chiller, even when the cooling water inlet temperature is less than the cooling water inlet temperature lower limit value, a differential pressure between an evaporation pressure and a condensation pressure can be maintained, and thus, desired refrigeration capacity may be exerted. In the related art, under even a circumstance in which the outside wet-bulb temperature is low and an effective reduction in energy consumption is achieved, it is not possible to make the cooling water inlet temperature be less than or equal to the lower limit value which is determined due to the limitation in the operation of the chiller, which interferes promotion of the reduction in energy consumption.

The present invention provides a heat source system, and a device and a method for controlling a cooling water supply device capable of achieving a reduction in energy consumption in the cooling water supply device without using a database.

Solution to Problem

According to a first aspect of the present invention, there is provided a device for controlling a cooling water supply device which includes a cooling tower and supplies cooling water to a condenser of a chiller, including: information acquisition means for acquiring a cooling water outlet temperature lower limit setpoint which is determined in accordance with a set temperature for a chilled water outlet in the chiller, from the chiller; lower limit temperature setting means for determining a cooling water inlet temperature lower limit setpoint using the cooling water outlet temperature lower limit setpoint and the load of the chiller; temperature setting means for comparing a cooling water inlet temperature lower limit value determined from an outside wet-bulb temperature and the cooling water inlet temperature lower limit setpoint, and for setting the higher one as a cooling water inlet temperature setpoint; and command generation means for generating a control command for a cooling tower fan and a control command for a cooling water flow rate, so as to match a cooling water inlet temperature and a cooling water outlet temperature respectively with the cooling water inlet temperature setpoint and the cooling water outlet temperature lower limit setpoint.

According to the aspect, the cooling water outlet temperature lower limit setpoint is determined in accordance with the set temperature for the chilled water outlet in the chiller, and the cooling water inlet temperature lower limit value is calculated using the cooling water outlet temperature lower limit setpoint and the load of the chiller. Accordingly, by taking the operation state of the chiller into consideration with respect to the cooling water outlet temperature lower limit setpoint and the cooling water inlet temperature lower limit setpoint, the cooling water outlet temperature lower limit setpoint and the cooling water inlet temperature lower limit setpoint can be set to proper values. Therefore, it is possible to maintain the differential pressure between the evaporation pressure and the condensation pressure, and it is possible to decrease the cooling water outlet temperature and the cooling water inlet temperature to the limits within a range in which predetermined refrigeration capacity can be exerted. As a result, it is possible to reduce the cooling water flow rate and it is possible to decrease the rotating speed of the fan in the cooling water pump or the cooling tower.

In the device for controlling a cooling water supply device, the lower limit temperature setting means may subtract a temperature difference between cooling water inlet and outlet from the cooling water outlet temperature lower limit setpoint, and may calculate the cooling water inlet temperature lower limit setpoint; and the temperature difference between cooling water inlet and outlet may be determined in accordance with the cooling water flow rate and the load of the chiller.

In this way, since the cooling water inlet temperature lower limit setpoint is calculated by subtracting the temperature difference between cooling water inlet and outlet determined in accordance with the cooling water flow rate and the load of the chiller from the cooling water outlet temperature lower limit setpoint, it is possible to set an appropriate cooling water inlet temperature lower limit setpoint in which the load of the chiller and the cooling water flow rate are taken into consideration.

According to a second aspect of the present invention, there is provided a device for controlling a cooling water supply device which includes a cooling tower and supplies cooling water to a condenser of a chiller, including: information acquisition means for acquiring a condensation pressure setpoint determined in accordance with a set temperature for a chilled water outlet in the chiller or a saturation temperature setpoint determined from the condensation pressure setpoint, from the chiller; lower limit temperature setting means for determining a cooling water inlet temperature lower limit setpoint using the condensation pressure setpoint or the saturation temperature setpoint; temperature setting means for comparing a cooling water inlet temperature lower limit value determined from an outside wet-bulb temperature and the cooling water inlet temperature lower limit setpoint, and for setting the higher one as a cooling water inlet temperature setpoint; and command generation means for generating a control command for a cooling tower fan and a control command for a cooling water flow rate, so as to match a cooling water inlet temperature with the cooling water inlet temperature setpoint, and to match a condensation pressure or a saturation temperature with the condensation pressure setpoint or the saturation temperature setpoint.

According to the aspect, the cooling water inlet temperature lower limit value is calculated using the condensation pressure setpoint of the chiller or the saturation temperature setpoint determined from the condensation pressure setpoint. Accordingly, it is possible to set the cooling water inlet temperature lower limit setpoint to an appropriate value in which the operation state of the chiller is taken into consideration. Therefore, it is possible to maintain the differential pressure between the evaporation pressure and the condensation pressure, and it is possible to decrease the cooling water outlet temperature and the cooling water inlet temperature to the limits within a range in which predetermined refrigeration capacity can be exerted. As a result, it is possible to reduce the cooling water flow rate and it is possible to decrease the rotating speed of the fan in the cooling water pump or the cooling tower.

In the device for controlling a cooling water supply device, the lower limit temperature setting means may subtract a temperature difference between cooling water inlet and outlet and a terminal temperature difference of the condenser from the condensation pressure setpoint or the saturation temperature setpoint, and may calculate the cooling water inlet temperature lower limit setpoint, and the temperature difference between cooling water inlet and outlet may be determined in accordance with the cooling water flow rate and the load of the chiller.

In this way, by subtracting the temperature difference between cooling water inlet and outlet determined in accordance with the cooling water flow rate and the load of the chiller, and the terminal temperature difference of the condenser, from the condensation pressure setpoint or the saturation temperature setpoint, the cooling water inlet temperature lower limit setpoint is calculated. Therefore, it is possible to set an appropriate cooling water inlet temperature lower limit setpoint in which the load of the chiller or the like is taken into consideration.

In the device for controlling a cooling water supply device, the terminal temperature difference of the condenser may be determined in accordance with the load of the chiller.

In this way, since the terminal temperature difference of the condenser is also determined in accordance with the load of the chiller, it is possible to set the cooling water inlet temperature lower limit setpoint to an appropriate value in accordance with the load of the chiller.

According to a third aspect of the present invention, there is provided a heat source system, including: a chiller which includes a compressor, a condenser, an expansion valve, and an evaporator; a cooling water supply device which includes a cooling tower, and supplies cooling water to the condenser of the chiller; and the device for controlling a cooling water supply device.

According to a fourth aspect of the present invention, there is provided a method for controlling a cooling water supply device which includes a cooling tower and supplies cooling water to a condenser of a chiller, including: an information acquiring step of acquiring a cooling water outlet temperature lower limit setpoint which is determined in accordance with a set temperature for a chilled water outlet in the chiller, from the chiller; a lower limit temperature setting step of determining a cooling water inlet temperature lower limit setpoint using the cooling water outlet temperature lower limit setpoint and the load of the chiller; a temperature setting step of comparing a cooling water inlet temperature lower limit value determined from an outside wet-bulb temperature and the cooling water inlet temperature lower limit setpoint, and for setting the higher one as a cooling water inlet temperature setpoint; and a command generating step of generating a control command for a cooling tower fan and a control command for a cooling water flow rate, so as to match a cooling water inlet temperature and a cooling water outlet temperature respectively with the cooling water inlet temperature setpoint and the cooling water outlet temperature lower limit setpoint.

According to a fifth aspect of the present invention, there is provided a method for controlling a cooling water supply device which includes a cooling tower and supplies cooling water to a condenser of a chiller, including: an information acquiring step of acquiring a condensation pressure setpoint determined in accordance with a set temperature for a chilled water outlet in the chiller or a saturation temperature setpoint determined from the condensation pressure setpoint, from the chiller; a lower limit temperature setting step of determining a cooling water inlet temperature lower limit setpoint using the condensation pressure setpoint or the saturation temperature setpoint; a temperature setting step of comparing a cooling water inlet temperature lower limit value determined from an outside wet-bulb temperature and the cooling water inlet temperature lower limit setpoint, and for setting the higher one as a cooling water inlet temperature setpoint; and a command generating step of generating a control command for a cooling tower fan and a control command for a cooling water flow rate, so as to match a cooling water inlet temperature with the cooling water inlet temperature setpoint, and to match a condensation pressure or a saturation temperature with the condensation pressure setpoint or the saturation temperature setpoint.

Advantageous Effects of Invention

According to the present invention, it is possible to achieve a reduction in energy consumption in a cooling water supply device without using a database.

DESCRIPTION OF EMBODIMENTS

[First Embodiment]

Hereinafter, a heat source system, and a device and a method for controlling a cooling water supply device according to a first embodiment of the present invention will be described with reference to the drawings.

Figure 1:
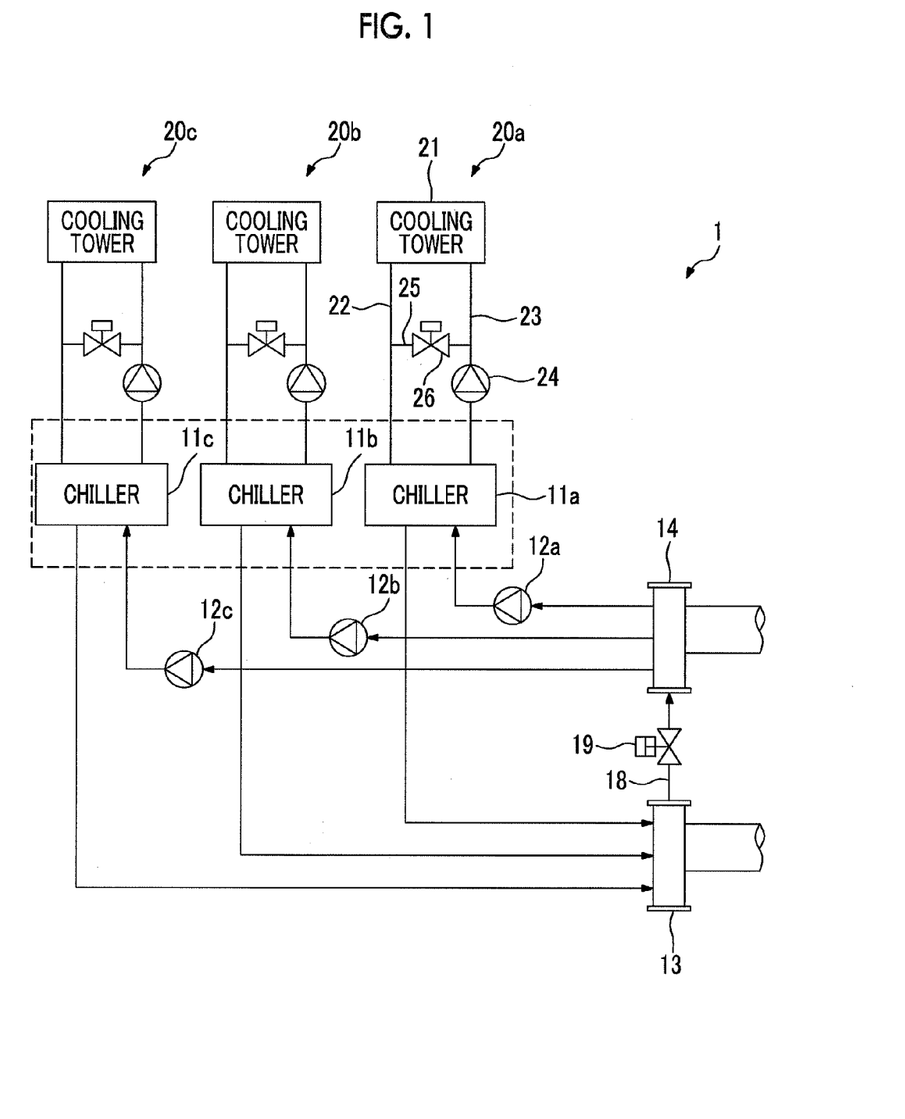
FIG. 1 is a view schematically showing a configuration of a heat source system according to a first embodiment of the present invention.

FIG. 1 is a view schematically showing a configuration of a heat source system according to the first embodiment of the present invention. As shown in FIG. 1, for example, a heat source system 1 includes a plurality of chillers 11a, 11b, and 11c which cool or heat chilled water (heating medium) supplied to an external load such as an air conditioner, a water heater, or factory equipment. In FIG. 1, a case where three chillers 11a, 11b, and 11c are installed is exemplified. However, the number of the installed chillers can be arbitrary determined.

On the upstream side of each of the chillers 11a, 11b, and 11c with respect to the flow of the chilled water, chilled water pumps 12a, 12b, and 12c which feed the chilled water are installed. The chilled water is fed to each of the chillers 11a, 11b, and 11c from a return header 14 by the chilled water pumps 12a, 12b, and 12c. Each of the chilled water pumps 12a, 12b, and 12c is driven by an inverter motor (not shown), and thus, variable flow control is performed by changing the rotating speed of the inverter motor.

The chilled water obtained from each of the chillers 11a, 11b, and 11c is collected in a supply header 13. The chilled water collected in the supply header 13 is supplied to the external load (not shown). The chilled water, which is applied to the air conditioning or the like in the external load and in which the temperature is increased, is returned to the return header 14. The chilled water diverges in the return header 14 and is fed to each of the chillers 11a, 11b, and 11c again.

In addition, a bypass pipe 18 is provided between the supply header 13 and the return header 14. By adjusting an opening degree of a chilled water bypass valve 19 provided in the bypass pipe 18, it is possible to adjust the flow rate of the chilled water supplied to the external load.

Moreover, each of cooling water supply devices 20a, 20b, and 20c is provided corresponding to each of the chillers 11a, 11b, and 11c. Each of the cooling water supply devices 20a, 20b, and 20c is a device which supplies the cooling water to a condenser 32 (refer to FIG. 2) of each of the chillers 11a, 11b, and 11c. The cooling water supply device 20a includes a cooling tower 21, an outgoing pipe 22 which supplies the cooling water cooled by the cooling tower 21 to the condenser 32, and a return pipe 23 which introduces the cooling water after the temperature is increased by heat exchange in the condenser 32 to the cooling tower 21. A cooling water pump 24 for adjusting the cooling water flow rate is provided in the return pipe 23. The flow rate of the circulated cooling water is adjusted by controlling the rotating speed of the cooling water pump 24. Moreover, a bypass pipe 25 is provided between the outgoing pipe 22 and the return pipe 23, and a bypass valve 26 is provided in the bypass pipe 25. By adjusting the opening degree of the bypass valve 26, the flow rate of the cooling water which bypasses from the outgoing pipe 22 to the return pipe 23 is adjusted. A fan (not shown) is provided in the cooling tower 21, and the cooling capacity is adjusted by controlling the rotating speed of the fan.

The cooling water supply devices 20b and 20c are also similarly configured to the cooling water supply device 20a. Here, in FIG. 1, the case where each of the cooling water supply devices 20a, 20b, and 20c includes one cooling tower 21 is exemplified. However, the number of the installed cooling towers can be arbitrary determined.

Figure 2:
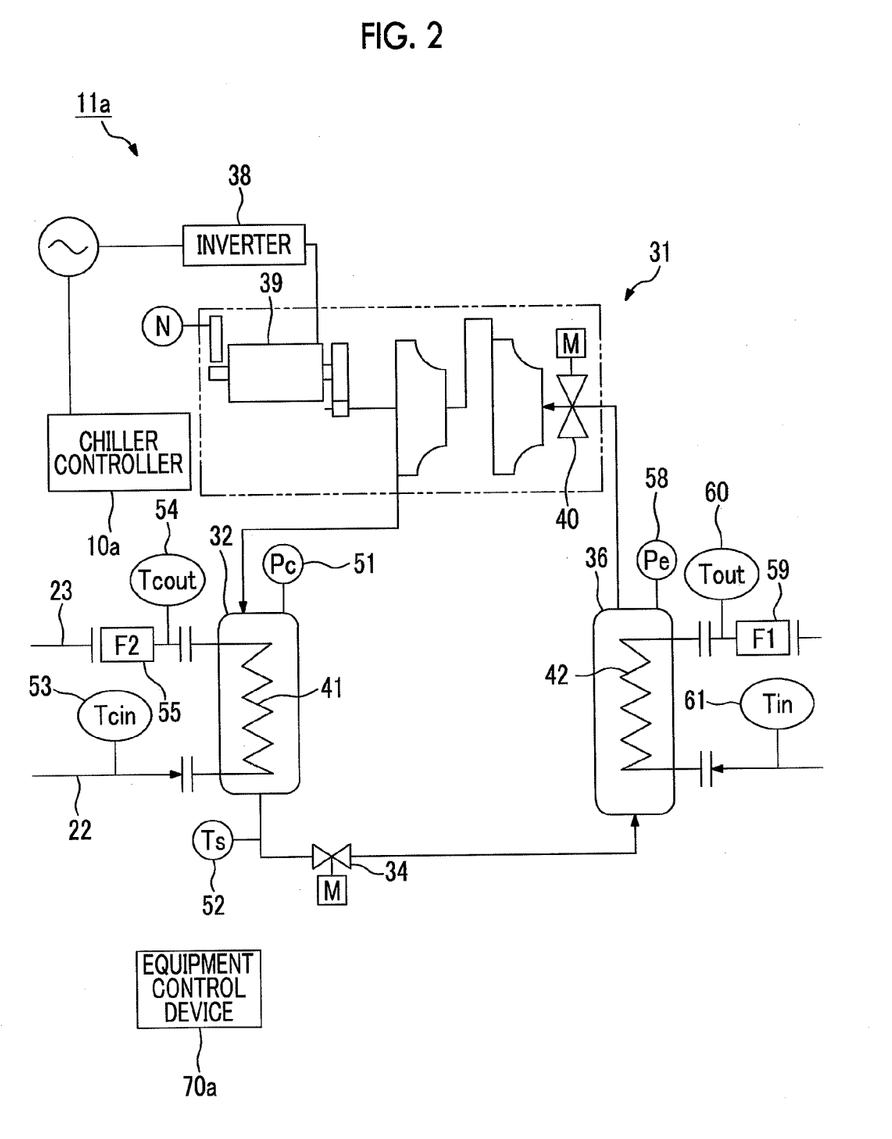
FIG. 2 is a view schematically showing a configuration of a chiller shown in FIG. 1.

In FIG. 2, a detailed configuration when a turbo chiller is applied as each of the chillers 11a, 11b, and 11c is shown. In FIG. 2, for easy understanding, only one chiller 11a among the three chillers provided in parallel is shown.

The chiller 11a mainly includes a turbo compressor 31 which compresses a refrigerant, a condenser 32 which condenses a high-temperature and high-pressure gas refrigerant compressed by the turbo compressor 31, an expansion valve 34 which expands a liquid refrigerant from the condenser 32, and a vaporizer 36 which evaporates the liquid refrigerant expanded by the expansion valve 34.

For example, the turbo compressor 31 is a two-stage centrifugal compressor, and is driven by an electric motor 39 in which the rotating speed is controlled by an inverter 38. The output of the inverter 38 is controlled by a chiller controller 10a. In addition, instead of the turbo compressor 31, a compressor having a fixed speed in which the rotating speed is constant may be adopted. An inlet guide vane 40 (hereinafter, referred to as "IGV") which controls the flow rate of the suctioned refrigerant is provided in the refrigerant suction port of the turbo compressor 31, and thus, the capacity control of the chiller 11a is possible.

A pressure sensor 51 for measuring a condensed refrigerant pressure Pc is provided in the condenser 32. Moreover, a temperature sensor 52 which measures the overcooled refrigerant temperature Ts is provided immediately on the downstream side of the condenser 32 with respect to the refrigerant flow. A pressure sensor 58 for measuring an evaporation pressure Pe is provided in the vaporizer 36. A chilled water pipe 42 for supplying the chilled water supplied to the external load (not shown) to the vaporizer 36 and for cooling the vaporizer 36 is inserted into the vaporizer 36. A flow sensor 59 which measures the flow rate F1 of the chilled water, a temperature sensor 60 which measures a chilled water outlet temperature Tout, and a temperature sensor 61 which measures a chilled water inlet temperature Tin are provided in the chilled water pipe 42.

The values measured by the pressure sensors 51 and 58, the temperature sensors 52, 60, and 61, and the flow sensor 59 are sent to the chiller controller 10a, and are used for the control of the chiller 11a.

In addition, a cooling and heat-transmitting pipe 41 for cooling the refrigerant flowing in the condenser 32 is inserted into the condenser 32. One end of the cooling and heat-transmitting pipe 41 is connected to the outgoing pipe 22 of the cooling water supply device 20a shown in FIG. 1, and the other end of the cooling and heat-transmitting pipe 41 is connected to the return pipe 23. The cooling water, which is cooled by the cooling tower 21 to adjust the temperature, circulates through the cooling and heat-transmitting pipe 41 through the outgoing pipe 22, and overcools the refrigerant circulating through the condenser 32. The cooling water, in which the temperature is increased by the heat exchange with the refrigerant, is fed to the cooling tower 21 through the outgoing pipe 22, and thus, in the cooling tower 21, the heat of the cooling water is discharged and the cooling water is cooled.

A temperature sensor 53 which measures a cooling water inlet temperature Tcin is provided in the outgoing pipe 22, and a temperature sensor 54 which measures the cooling water outlet temperature Tcout and a flow sensor 55 which measures the flow rate F2 of the cooling water are provided in the return pipe 23.

The values measured by the temperature sensors 53 and 54, and the flow sensor 55 are sent to the equipment control device 70a controlling the cooling water supply device 20a, and are used for the flow rate control and the temperature control of the cooling water. Specifically, the values are used for the control of the rotating speed of the fan provided in the cooling tower 21, the control of the rotating speed of the cooling water pump 24, and the control of the valve opening degree of the bypass valve 26.

Figure 3:
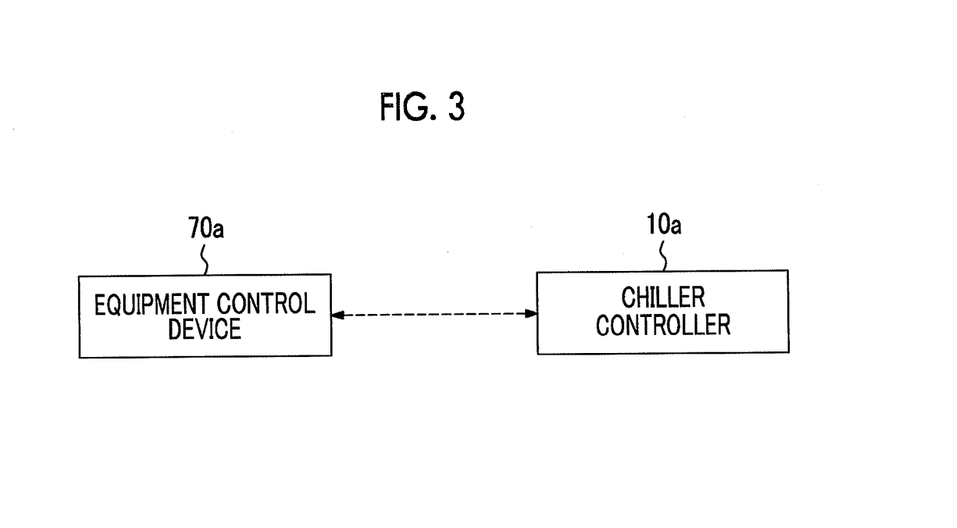
FIG. 3 is a view showing a control system with respect to a chiller and a cooling water supply device provided corresponding to the chillers among control systems in the heat source system shown in FIG. 1.

FIG. 3 is a view exemplifying the control system with respect to the chiller 11a and the cooling water supply device 20a provided corresponding to the chiller 11a and among the control systems in the heat source system 1 shown in FIG. 1. In FIG. 3, the chiller controller 10a and the equipment control device 70a are connected to each other via a communication medium, and bidirectional communication is possible.

For example, the equipment control device 70a and the chiller controller 10a are computers, and include a main storage device such as a Central Processing Unit (CPU) or a Random Access Memory (RAM), an auxiliary storage device, a communication device which sends and receives information by executing communication with an external device, or the like.

The auxiliary storage device is a computer readable recording medium, and for example, includes a magnetic disk, a magneto-optical disk, a CD-ROM, a DVD-ROM, a semiconductor memory, or the like. Various programs are stored in the auxiliary storage device, the CPU reads programs from the auxiliary storage device to the main storage device, and various processing is realized by executing the programs.

Figure 4:
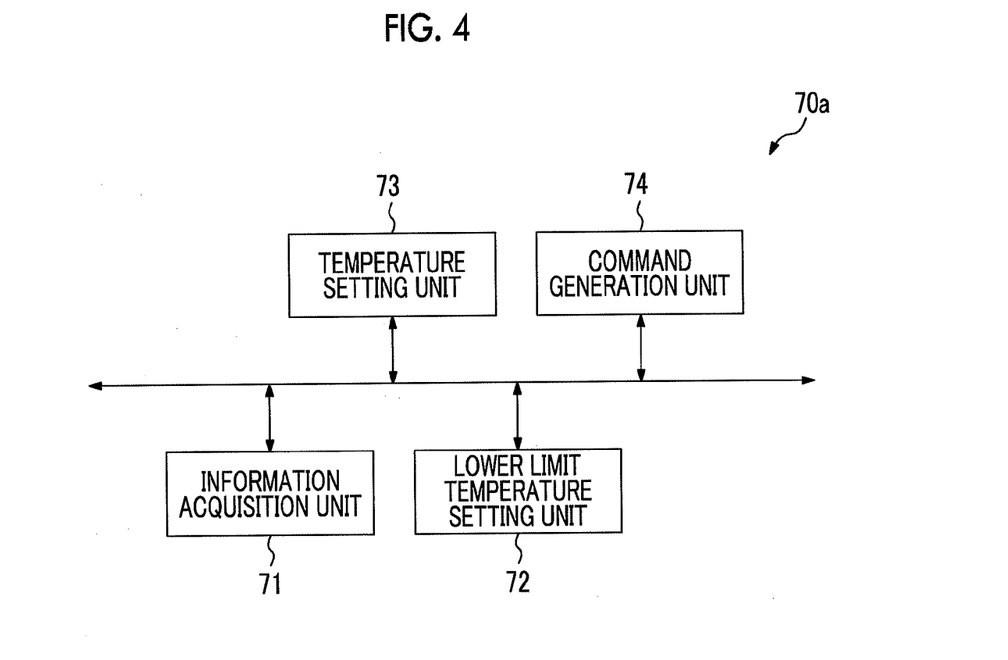
FIG. 4 is a functional block diagram in which functions included in an equipment control device according to the first embodiment of the present invention are developed and shown.

FIG. 4 is a functional block diagram in which functions included in the equipment control device 70a are developed and shown. As shown in FIG. 4, the equipment control device 70a mainly includes an information acquisition unit 71, a lower limit temperature setting unit 72, a temperature setting unit 73, and a command generation unit 74.

The information acquisition unit 71 acquires the cooling water outlet temperature lower limit setpoint from the chiller controller 10a. The cooling water outlet temperature lower limit setpoint is determined in accordance with the set temperature for the chilled water outlet of the chiller 11a, and is calculated by the chiller controller 10a.

For example, in the chiller controller 10a, the following Expression (1) which includes the set temperature for the chilled water outlet as a parameter is provided, and the cooling water outlet temperature lower limit setpoint is calculated by substituting the set temperature for the chilled water outlet into Expression (1).

Cooling Water Outlet Temperature Lower Limit Setpoint=Chilled water Outlet Temperature Setpoint+Necessary Temperature Difference Between Chilled water Outlet and Cooling Water Outlet (1)

In Expression (1), the "necessary temperature difference between the chilled water outlet and the cooling water outlet" is a value which is determined in accordance with the chiller and the chilled water outlet temperature setpoint, and is a value corresponding to the pressure difference between the evaporation pressure defined in accordance with the chiller and the condensation pressure. For example, the "necessary temperature difference between the chilled water outlet and the cooling water outlet" is determined as follows.

First, if the chilled water outlet temperature setpoint is determined, an evaporation-saturation temperature is determined from the chilled water outlet temperature setpoint and the terminal temperature difference of the vaporizer, and the evaporation pressure is determined from the evaporation-saturation temperature. The condensation pressure is determined by adding a necessary pressure difference defined in accordance with the chiller to the evaporation pressure. Moreover, a condensation-saturation temperature is determined from the condensation pressure, and the cooling water outlet temperature is determined from the condensation-saturation temperature and the terminal temperature difference of the condenser. The difference between the cooling water outlet temperature and the chilled water outlet temperature setpoint becomes the "necessary temperature difference between the chilled water outlet and the cooling water outlet".

Here, the cooling water outlet temperature lower limit setpoint is set so as not to be less than a predetermined cooling water outlet temperature lower limit setpoint which is defined in accordance with the kind of the chiller in advance. That is, the cooling water outlet temperature lower limit setpoint is set so that the following Expression (2) is satisfied.

Defined Cooling Water Outlet Temperature Lower Limit Value≤Cooling Water Outlet Temperature Lower Limit Setpoint (2)

The lower limit temperature setting unit 72 determines the cooling water inlet temperature lower limit setpoint using the cooling water outlet temperature lower limit setpoint acquired by the information acquisition unit 71. For example, the lower limit temperature setting unit 72 calculates the cooling water inlet temperature lower limit setpoint using the following Expression (3).

Cooling Water Inlet Temperature Lower Limit Setpoint=Cooling Water Outlet Temperature Lower Limit Setpoint−Temperature Difference Between Cooling Water Inlet and Outlet (3)

The temperature difference between cooling water inlet and outlet is determined in accordance with the cooling water flow rate and the load of the chiller 11a. For example, the temperature difference between cooling water inlet and outlet is calculated by the following Expression (4) which includes a rated temperature difference between cooling water inlet and outlet, a rated cooling water flow rate, a cooling water flow rate, and the load of the chiller as the parameters.

Temperature Difference between Cooling Water Inlet and Outlet=Rated Temperature Difference between Cooling Water Inlet and Outlet×Rated Cooling Water Flow Rate/Cooling Water Flow Rate×Load of Chiller   (4)

In Expression (4), the rated temperature difference between cooling water inlet and outlet and the rated cooling water flow rate are known values which have been registered in advance, and the design values on each occasion are used for the cooling water flow rate and the load of the chiller.

The temperature setting unit 73 compares the cooling water inlet temperature lower limit value determined from the outside wet-bulb temperature and the cooling water inlet temperature lower limit setpoint, and sets the higher one as the cooling water inlet temperature setpoint. Here, for example, the cooling water inlet temperature lower limit value is calculated by including the effect of approaching the cooling tower 21 on the outside wet-bulb temperature.

The command generation unit 74 generates a control command with respect to the cooling water flow rate for matching the cooling water outlet temperature Tcout with the cooling water outlet temperature lower limit setpoint which is acquired by the information acquisition unit 71. For example, a difference between the cooling water outlet temperature lower limit setpoint and the cooling water outlet temperature Tcout is calculated, a PI control, a PID control, or the like is performed on the difference, and thus, the rotating speed command of the cooling water pump 24 is generated.

Moreover, the command generation unit 74 generates the rotating speed command of the fan of the cooling tower 21 and the opening degree command of the bypass valve 26 for matching the cooling water inlet temperature Tcin with the cooling water inlet temperature setpoint set by the temperature setting unit 73. Specifically, a difference between the cooling water inlet temperature setpoint and the cooling water inlet temperature Tcin is calculated, the PI control, the PID control, or the like is performed on the difference, and thus, the valve opening degree command of the cooling water bypass valve 26 and the rotating speed command of the fan of the cooling tower 21 are generated.

Figure 5:
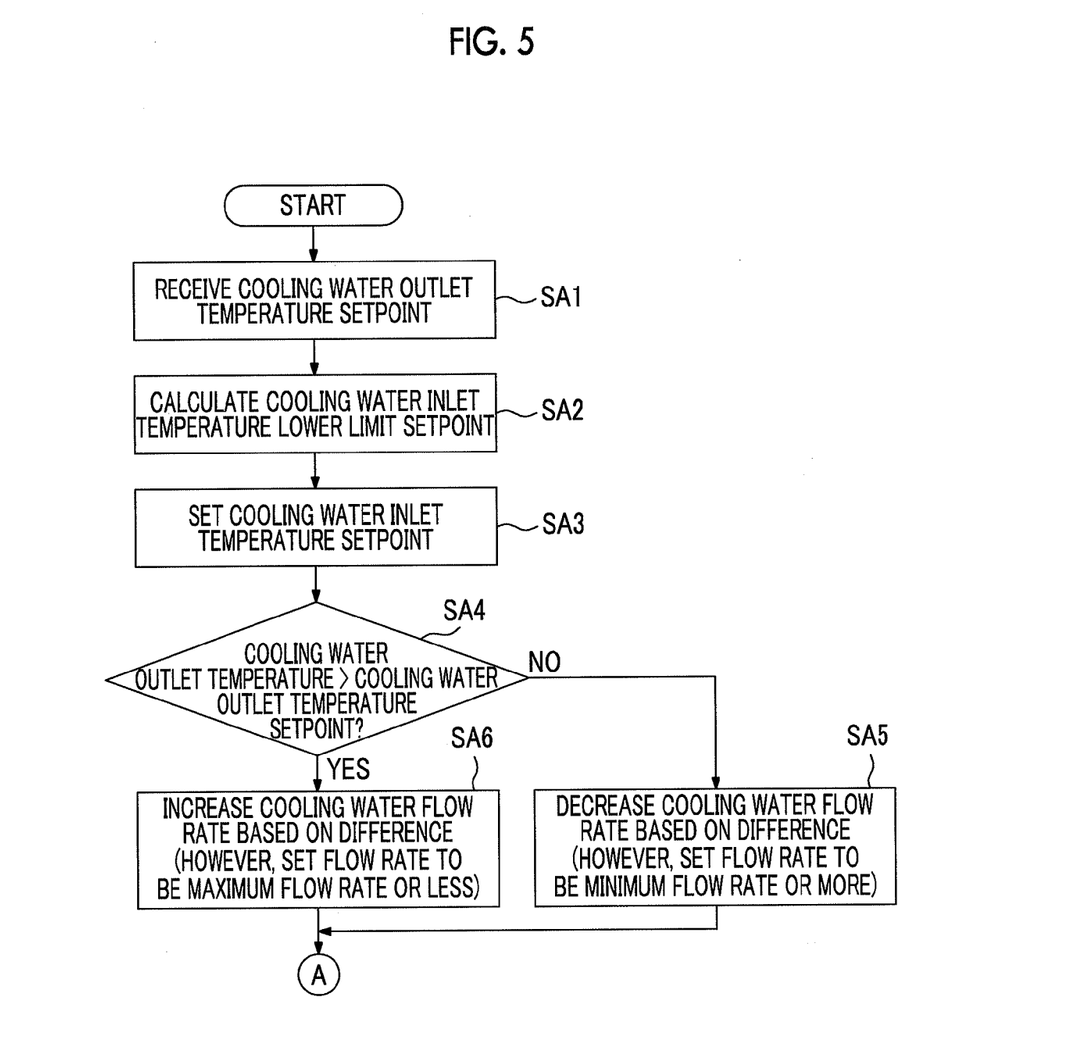
FIG. 5 is a flowchart showing processing procedures which are performed by the equipment control device according to the first embodiment of the present invention.
Figure 6:
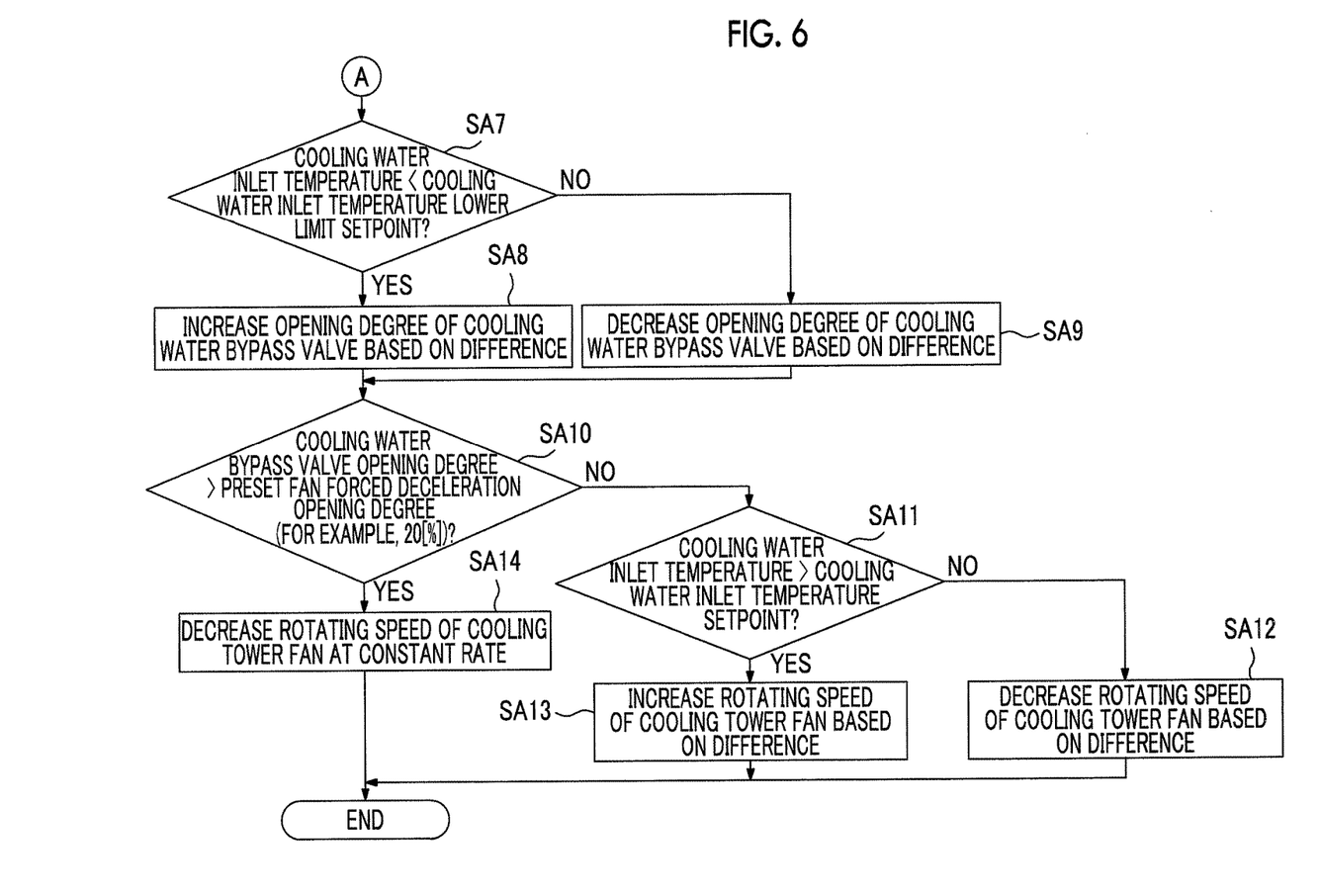
FIG. 6 is a flowchart showing processing procedures which are performed by the equipment control device according to the first embodiment of the present invention.

Next, the processing performed by the equipment control device 70a will be described with reference to FIGS. 5 and 6.

First, in the chiller controller 10a, the cooling water outlet temperature lower limit setpoint corresponding to the set temperature for the chilled water outlet is calculated using Expression (1). In this case, when the cooling water outlet temperature lower limit setpoint is less than the predetermined cooling water outlet temperature lower limit value, the cooling water outlet temperature lower limit value is set as the cooling water outlet temperature lower limit setpoint. The cooling water outlet temperature lower limit setpoint determined by the chiller controller 10a is sent to the equipment control device 70a, and is received and acquired by the information acquisition unit 71 of the equipment control device 70a (Step SA1 of FIG. 5).

The cooling water outlet temperature lower limit setpoint acquired by the information acquisition unit 71 is output to the lower limit temperature setting unit 72 and the command generation unit 74.

In the lower limit temperature setting unit 72, the cooling water inlet temperature lower limit setpoint is calculated by substituting the cooling water outlet temperature lower limit setpoint into Expression (3) (Step SA2). In this case, the temperature difference between cooling water inlet and outlet which is included in Expression (3) as the parameter is calculated by using the flow rate F2 of the cooling water measured by the flow sensor 55 and the load of the chiller 11a notified from the chiller controller 10a in Expression (4).

The cooling water inlet temperature lower limit setpoint set in the lower limit temperature setting unit 72 is output to the temperature setting unit 73. In the temperature setting unit 73, the cooling water inlet temperature lower limit value which includes the effect of approaching the cooling tower 21 on the outside wet-bulb temperature and the cooling water inlet temperature lower limit setpoint are compared, and the higher one is set as the cooling water inlet temperature setpoint (Step SA3).

The cooling water inlet temperature setpoint set as described above is output to the command generation unit 74. In the command generation unit 74, the rotating speed command of the fan of the cooling tower 21 and the valve opening degree command of the cooling water bypass valve 26 for matching the cooling water inlet temperature Tcin measured by the temperature sensor 53 with the cooling water inlet temperature setpoint is generated, and the rotating speed command of the cooling water pump 24 for matching the cooling water outlet temperature Tcout measured by the temperature sensor 54 with the cooling water outlet temperature lower limit setpoint is generated.

Accordingly, when the cooling water outlet temperature Tcout is lower than the cooling water outlet temperature lower limit setpoint ("NO" in Step SA4), the cooling water flow rate is decreased by the decrease of the rotating speed of the cooling water pump 24 (Step SA5), and on the other hand, when the cooling water outlet temperature Tcout is higher than the cooling water outlet temperature lower limit setpoint ("YES" in Step SA4), the cooling water flow rate is increased by the increase of the rotating speed of the cooling water pump 24 (Step SA6). In addition, in the cooling water flow rate, the ranges of the maximum flow rate and the minimum flow rate are set in advance, and thus, the cooling water flow rate is controlled so that the rate does not exceed the ranges. Here, as disclosed in Japanese Unexamined Patent Application Publication No. 2010-236728, the maximum flow rate may be changed in accordance with the load (load rate [%]) of the chiller.

When the cooling water inlet temperature Tcin is lower than the cooling water inlet temperature setpoint ("YES" in Step SA7 of FIG. 6), the cooling water flow rate supplied to the condenser 32 is decreased by the increase in the valve opening degree of the cooling water bypass valve 26 in accordance with the difference between the cooling water inlet temperature Tcin and the cooling water inlet temperature setpoint (Step SA8). On the other hand, when the cooling water inlet temperature Tcin is higher than the cooling water inlet temperature setpoint ("NO" in Step SA7), the cooling water flow rate supplied to the condenser 32 is increased by the decrease in the valve opening degree of the cooling water bypass valve in accordance with the difference between the cooling water inlet temperature Tcin and the cooling water inlet temperature setpoint (Step SA9).

In addition, when the cooling water bypass valve opening degree is less than or equal to a preset fan forced deceleration opening degree (for example, 20 [%]) ("NO" in Step SA10) and the cooling water inlet temperature Tcin is lower than the cooling water inlet temperature setpoint ("NO" in Step SA11), the cooling of the cooling water is weakened by the decrease in the rotating speed of the fan of the cooling tower 21 in accordance with the difference between the cooling water inlet temperature Tcin and the cooling water inlet temperature setpoint (Step SA12), and when the cooling water inlet temperature Tcin is higher than the cooling water inlet temperature setpoint ("YES" in Step SA11), the cooling of the cooling water is strengthened by the increase in the rotating speed of the fan of the cooling tower 21 in accordance with the difference between the cooling water inlet temperature Tcin and the cooling water inlet temperature setpoint (Step SA13). In addition, when the cooling water bypass valve opening degree exceeds the preset fan forced deceleration opening degree (for example, 20 [%]) ("YES" in Step SA10), a control command which decreases the rotating speed of the fan of the cooling tower 21 at a constant rate is generated (Step SA14).

In addition, the above-described series of processing is repeatedly performed in a predetermined control cycle, the cooling water inlet temperature setpoint and the cooling water outlet temperature lower limit setpoint are set to appropriate values corresponding to the operation states of the chiller 11a, and the cooling water temperature and the cooling water flow rate are adjusted based on the set values.

In addition, the control similar to the above-described control is performed not only between the chiller 11a and the cooling water supply device 20a described above but also between the chiller 11b and the cooling water supply device 20b and between the chiller 11c and the cooling water supply device 20c.

As described above, according to the heat source system 1 and the device and method for controlling the cooling water supply device 20a of the present embodiment, since the cooling water outlet temperature lower limit setpoint is set based on the set temperature for the chilled water outlet in the chiller 11a, and the cooling water inlet temperature setpoint is determined by taking the cooling water outlet temperature lower limit setpoint and the load of the chiller into consideration, it is possible to set the cooling water inlet temperature setpoint and the cooling water outlet temperature lower limit setpoint so as to be appropriate values in accordance with the operation state of the chiller 11a. Accordingly, it is possible to decrease the cooling water inlet temperature setpoint up to the limit. As a result, for example, when the outside wet-bulb temperature is low, it is possible to achieve the decrease in the rotating speed of the fan in the cooling tower 21 and the decrease in the rotating speed of the cooling water pump 24, and thus, unlike the related art, it is possible to decrease power consumption in the cooling water supply device 20a without constructing a database or the like.

[Second Embodiment]

Next, a heat source system, and a device and method for controlling a cooling water supply device according to a second embodiment of the present invention will be described.

In the above-described first embodiment, the cooling water outlet temperature lower limit setpoint is set based on the chilled water outlet temperature setpoint in the chiller 11a. However, in the present embodiment, the cooling water outlet temperature is not controlled, and the condensation pressure setpoint or the saturation temperature setpoint is set based on the condensation pressure or the saturation temperature determined from the condensation pressure, and the cooling water flow rate is changed so that the condensation pressure or the saturation temperature matches the set values.

In addition, in the above-described first embodiment, the cooling water inlet temperature lower limit setpoint is calculated based on the cooling water outlet temperature lower limit setpoint. However, in the present embodiment, the cooling water inlet temperature lower limit setpoint is calculated using the condensation pressure setpoint or the saturation temperature setpoint.

Hereinafter, descriptions with respect to common matters between the above-described first embodiment and the present embodiment are omitted, and different matters therebetween will be mainly described. In addition, for easy description, hereinafter, a case where the cooling water temperature is controlled using the condensation pressure is described. However, the present invention is similarly applied to a case where the saturation temperature is used instead of the condensation pressure.

First, in the present embodiment, in the chiller controller 10a, the condensation pressure setpoint is set. For example, in the chiller controller 10a, the following Expression (5) including the set temperature for the chilled water outlet as a parameter is provided, and the condensation pressure setpoint is calculated by substituting the set temperature for the chilled water outlet into Expression (5). The condensation pressure setpoint is output to the equipment control device 70a.

Condensation Pressure Setpoint=max (Evaporation Pressure With Respect To Chilled water Outlet Temperature Setpoint+Necessary Pressure Difference between Condensation Pressure and Evaporation Pressure, Condensation Pressure Lower Limit Value in Chiller) (5)

In this way, as the condensation pressure setpoint, the higher one between (a) the pressure from addition of the necessary pressure difference between the condensation pressure and the evaporation pressure to the evaporation pressure with respect to the chilled water outlet temperature setpoint and (b) the condensation pressure lower limit value in the chiller is set.

In the equipment control device 70a, the cooling water inlet temperature lower limit setpoint is calculated using the condensation pressure setpoint. For example, the cooling water inlet temperature lower limit setpoint is calculated using the following Expression (6).

Cooling Water Inlet Temperature Lower Limit Setpoint=Saturation Temperature With Respect To Condensation Pressure Setpoint−γ−Temperature Difference between Cooling Water Inlet and Outlet (6)

In Expression (6), γ is the terminal temperature difference of the condenser 32, may be constant value, or may be a variable set in accordance with the load of the chiller 11a. When γ is set to a variable, the terminal temperature difference of the condenser 32 is set in accordance with the load of the chiller.

When γ is set to a constant value, the calculation can be easily performed, and when γ is set to a variable, the cooling water inlet temperature lower limit setpoint can be finely set in accordance with the load of the chiller, and it is possible to decrease the terminal temperature difference of the condenser 32 when the load is small. Accordingly, it is possible to set the cooling water inlet temperature lower limit setpoint so as to be lower.

The cooling water inlet temperature lower limit setpoint set described above is compared with the cooling water inlet temperature lower limit value determined from the approaching of the cooling tower on the outside wet-bulb temperature, and the higher one is set as the cooling water inlet temperature setpoint.

Moreover, in the present embodiment, the rotating speed of the cooling water pump 24 is controlled so that the condensation pressure in the chiller 11a matches the condensation pressure setpoint, and the valve opening degree of the bypass valve 26 and the rotating speed in the fan of the cooling tower 21 are controlled so that the cooling water inlet temperature Tcin matches the cooling water inlet temperature setpoint.

As described above, according to the heat source system, and the device and the method for controlling the cooling water supply device of the present embodiment, since the condensation pressure setpoint is set based on the condensation pressure lower limit value in the chiller 11a, and the cooling water inlet temperature setpoint is set using the load of the condensation pressure setpoint and the load of the chiller, it is possible to decrease the cooling water inlet temperature setpoint up to the limit in accordance with the operation state of the chiller 11a. Accordingly, when the outside wet-bulb temperature is low, it is possible to achieve the decrease in the rotating speed of the fan in the cooling tower 21 and the decrease in the rotating speed of the cooling water pump, and thus, unlike the related art, it is possible to decrease power consumption in the cooling water supply device 20a without constructing a database or the like.

Hereinbefore, embodiments of the present invention are described. However, the present invention is not limited to the above-described embodiments, and various modifications may be performed within a scope which does not depart from the gist of the present invention.

REFERENCE SIGNS LIST

1: HEAT SOURCE SYSTEM
10a: CHILLER CONTROLLER
11a, 11b, 11c: CHILLER
20a, 20b, 20c: COOLING WATER SUPPLY DEVICE
21: COOLING TOWER
22: OUTGOING PIPE
23: RETURN PIPE
24: COOLING WATER PUMP
25: BYPASS PIPE
26: COOLING WATER BYPASS VALVE
32: CONDENSER
51, 58: PRESSURE SENSOR
52, 53, 54, 60, 61: TEMPERATURE SENSOR
55, 59: FLOW SENSOR
70a: EQUIPMENT CONTROL DEVICE
71: INFORMATION ACQUISITION UNIT
72: LOWER LIMIT TEMPERATURE SETTING UNIT
73: TEMPERATURE SETTING UNIT
74: COMMAND GENERATION UNIT

The invention claimed is:

1. A device for controlling a cooling water supply device which includes a cooling tower and supplies cooling water to a condenser of a chiller, comprising:
an equipment controller configured to:
acquire a cooling water outlet temperature lower limit setpoint which is determined in accordance with a set temperature for a chilled water outlet in the chiller, from the chiller;
determine a cooling water inlet temperature lower limit setpoint using the cooling water outlet temperature lower limit setpoint and the load of the chiller;
compare a cooling water inlet temperature lower limit value determined from an outside wet-bulb temperature and the cooling water inlet temperature lower limit setpoint, and for setting the higher one as a cooling water inlet temperature setpoint; and
generate a control command for a cooling tower fan and a control command for a cooling water flow rate, so as to match a cooling water inlet temperature and a cooling water outlet temperature respectively with the cooling water inlet temperature setpoint and the cooling water outlet temperature lower limit setpoint.

2. The device for controlling a cooling water supply device according to claim 1,
wherein the equipment controller is further configured to subtract a temperature difference between a cooling water inlet and outlet from the cooling water outlet temperature lower limit setpoint to calculate the cooling water inlet temperature lower limit setpoint, and
wherein the temperature difference between cooling water inlet and outlet is determined in accordance with the cooling water flow rate and the load of the chiller.

3. A heat source system, comprising:
a chiller which includes a compressor, a condenser, an expansion valve, and an evaporator;
a cooling water supply device which includes a cooling tower, and supplies cooling water to the condenser of the chiller; and
the device for controlling a cooling water supply device according to claim 1.

4. A method for controlling a cooling water supply device which includes a cooling tower and supplies cooling water to a condenser of a chiller, comprising:
acquiring a cooling water outlet temperature lower limit setpoint which is determined in accordance with a set temperature for a chilled water outlet in the chiller, from the chiller;
determining a cooling water inlet temperature lower limit setpoint using the cooling water outlet temperature lower limit setpoint and the load of the chiller;
comparing a cooling water inlet temperature lower limit value determined from an outside wet-bulb temperature and the cooling water inlet temperature lower limit setpoint, and for setting the higher one as a cooling water inlet temperature setpoint; and
generating a control command for a cooling tower fan and a control command for a cooling water flow rate, so as to match a cooling water inlet temperature and a cooling water outlet temperature respectively with the cooling water inlet temperature setpoint and the cooling water outlet temperature lower limit setpoint.

5. A heat source system, comprising:
a chiller which includes a compressor, a condenser, an expansion valve, and an evaporator;
a cooling water supply device which includes a cooling tower, and supplies cooling water to the condenser of the chiller; and
the device for controlling a cooling water supply device according to claim 2.

* * * * *